Aug. 30, 1932.  R. W. CLIFFORD  1,874,449
LATERAL MOTION DEVICE
Filed Sept. 24, 1930
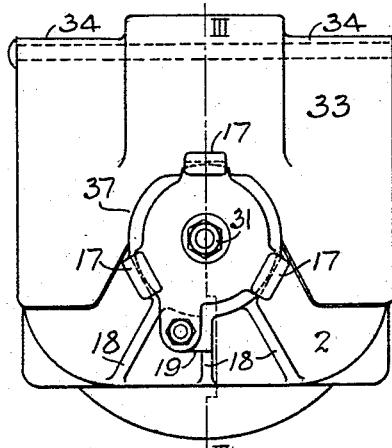
- FIG.2.-
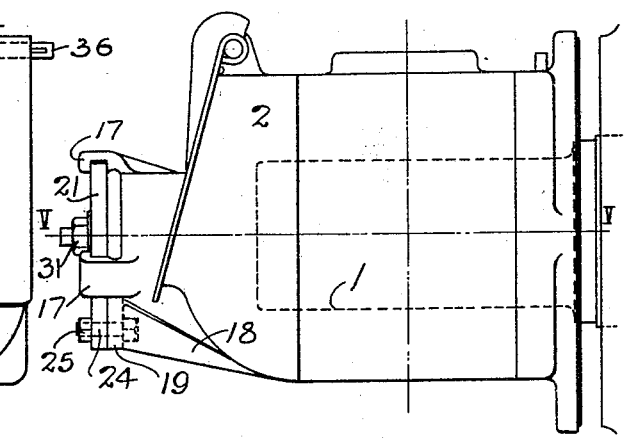
- FIG.1. -
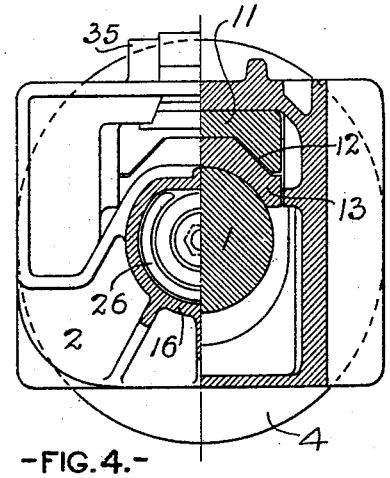
-FIG.4.-
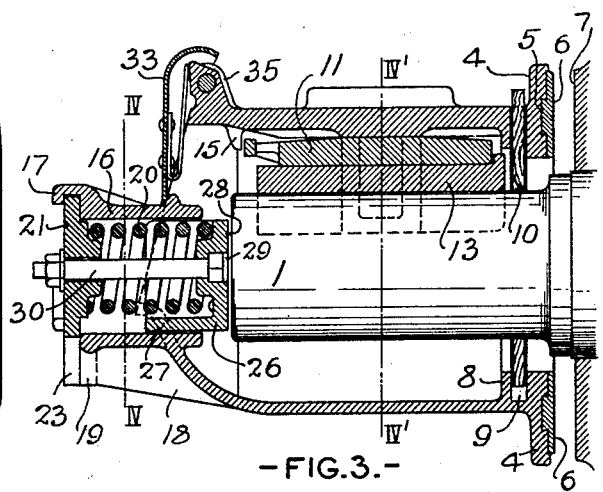
-FIG.3.-
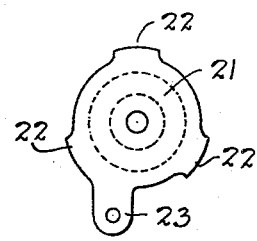
- FIG.6.-
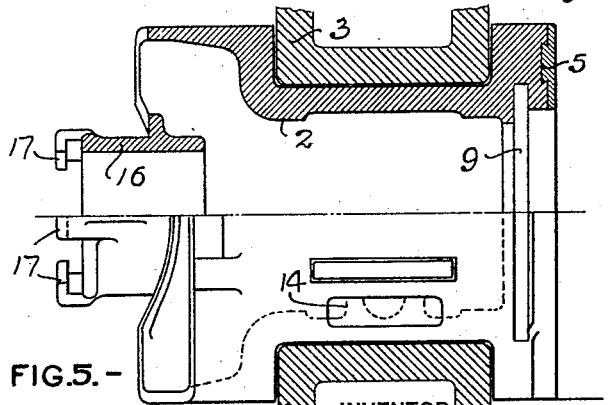
- FIG.5.-
INVENTOR
Roger W. Clifford.
BY
S. C. Yeaton
ATTORNEY Patented Aug. 30, 1932

1,874,449

UNITED STATES PATENT OFFICE

ROGER W. CLIFFORD, OF SCHENECTADY, NEW YORK

LATERAL MOTION DEVICE

Application filed September 24, 1930. Serial No. 483,999.

In supporting the back end of a locomotive, it has been the practice to employ a four wheel trailing truck. Such trucks, while having an increased carrying capacity over that of two wheel trucks by reason of the additional axle, may be so constructed as to avoid any substantial increase in friction between the flanges of the wheels and the rails when curved sections of track are passed over. This is accomplished by employing means for permitting one set of wheels and their axle to have a lateral movement with relation to the truck when travelling over the curve. A truck of this character is described in U. S. Reissue Letters Patent 16,451, to A. W. Bruce dated Nov. 2, 1926.

The object of the present invention is to provide an improved means for permitting the aforesaid lateral movement of the wheels and their axle while the truck is passing over the curved section of the track and effecting an adjustment of the axle and wheels back to their normal position after such section has been passed over.

All and any changes in the details of construction of the specific embodiment of the invention hereinafter exemplified which may prove desirable and be apparent to those skilled in the art, are contemplated as a part of this invention, within the spirit and scope of the appended claims. While the device claimed herein is particularly adaptable for use on a four wheel trailing truck of the type aforementioned, it will of course be understood that the invention is adaptable for use in any case where the lateral adjustment of an axle and its wheels is desired.

In the accompanying drawing Figure 1, is a side elevation of a journal box with the invention applied thereto; Fig. 2, is an end view of the same; Fig. 3, is a longitudinal section taken on the line III—III of Fig. 2; Fig. 4, is a vertical section, the left side being taken on the line IV—IV of Fig. 3, and the right side on the line IV'—IV' of Fig. 3; Fig. 5, is a part plan view, its upper half being a horizontal section on the line V—V of Fig. 1; and Fig. 6, is a front view of the outer spring seat.

Referring in detail to the drawing, the journal 1, is positioned in a journal box 2, which is secured to the truck frame by any convenient means such as the pedestals 3 (Fig. 5). In accordance with the practice well known in the art, the journal box 2, is left open at its inner end to receive the journal. A flange 4 is formed on the inner end of the journal box and is provided with a groove 5 in its outer side in which is mounted a wearing face 6 for the hub face 7 of a wheel mounted on the axle adjacent its journal. The journal boxes 2, (only one being shown) are so spaced with relation to the wheels on the axle that their respective wearing faces 6 will be a limited distance from the respective hub faces 7 of the wheels when the same are in their normal position, so that upon passing over a curved section of track, the wheels will be permitted a predetermined amount of lateral movement, more particularly the said distance between the wearing faces on the journal boxes and the hub faces of the wheels. An inwardly projecting flange 8 is formed on the inner sides of the journal boxes and is spaced from the inner side of the flange 4 so as to provide a groove 9 in which a dust guard 10 is held. The dust guard surrounds the journal and serves to protect the interior of the journal box from dust or foreign matter. Beneath the upper side of the journal box a wedge 11 is positioned, said wedge having a longitudinal groove 12 formed in the bottom of same. A bearing 13 of standard construction is disposed above the journal, its upper side being wedge-shaped and engaging with groove 12 of the wedge. In the usual manner the bearing 13 is held against inward lateral movement by projections 14 formed on the inner walls of the journal box; and by means of an upwardly extending flange on the inner end of the bearing 13 and a lug 15 formed on the upper inner wall of the journal box, the wedge 11 is secured against lateral movement in either direction and the bearing 13 against outward lateral movement, the wedge 11 and bearing 13 being adapted upon the raising of the journal box away from the journal, to be laterally withdrawn from the said journal box.

At the outer end of the journal box a sleeve 16 is disposed. The sleeve member is formed integrally with the outer wall of the journal box and is tubular shaped, its upper side being flattened to permit the greatest possible space between it and the upper wall of the journal box, for removal of the wedge and bearing. On the outer end of the sleeve are formed inwardly projecting gibs 17; and strengthening ribs 18 are formed on the lower outer wall of the journal box and the lower side of the sleeve, integrally therewith. The middle rib 18 is provided with a flange 19 extending to one side of same. A spring 20 is disposed within the sleeve 16 and an outer spring seat 21 is provided therefor. The outer seat 21 is circular in shape and of such dimension as to be able to horizontally pass between the gibs 17 to rest against the outer end of the sleeve. On the circumference of the outer spring seat are formed projections 22 adapted to engage with the gibs 17 when the outer seat is partly rotated after having been passed longitudinally between the said gibs against the end of the sleeve, so as to be held in position thereby. An outwardly extending arm 23 is formed on the said seat and adapted to secure the same in its aforesaid engaged position by means of a bolt 24 passed through said arm and the flange 19 and secured in place by nut 25. At the inner end of the sleeve a spring seat 26 is slidably disposed, the said seat comprising a cylindrical body 27 cut away at its upper side so as to fit in said sleeve and closed at its outer end by a circular wall 28 also having the upper part of its circumference flattened to correspond with the shape of the sleeve. The inner spring seat is formed with a recess 29.

A bolt 30 extending longitudinally through the sleeve and the spring seats is secured to the outer spring seat by a nut 31, whereby the seats are held in a laterally adjusted position against the spring 20 at a suitable normal tension. It will be apparent that the spring 20, together with the outer and inner spring seats 21 and 26, and the bolt 30, may be removed as a unit simply by removing the bolt 24 and turning the outer seat 21 so as to disengage the projections 22 from the gib 17, and withdrawing the said parts outwardly through the sleeve.

The upper outer end of the journal box is left open to allow access to the interior of the journal box and to permit the removal of the wedge 11 and the bearing 13, and is provided with a cover 33 hingedly connected to the journal box by means of lugs 34 and 35 respectively formed on the cover and journal box and the pin 36 passing longitudinally through said lugs. The lower portion of the cover 33 is formed with a recess or opening 37 shaped to fit around the sleeve 16.

In the operation of a truck having the aforedescribed lateral motion devices provided for one of its axles, upon its passing over a curved section of track, that axle and its wheels will be permitted to move laterally a predetermined distance, that is the distance afforded by the space between the box wearing face 6 and the wheel hub face 7, this movement being sufficient to allow the wheels to pass over the curved track without any substantial increase of friction between the flanges and the rails. It will be apparent that upon such lateral movement one end of the axle 1, will bear against its spring seat 28 forcing it outward against the tension of the spring 20 so that after the truck has passed over the curved section of track, the force of the spring exerted on the inner seat and through same on the end of the axle will adjust the axle to its normal position.

The invention claimed and desired to be secured by Letters Patent is:

1. In a lateral motion journal box construction, the combination of a journal box, an axle having a journal, an axle journal bearing disposed within said box and adapted to permit the lateral movement of the journal, a sleeve formed in the outer end of said journal box, resilient means disposed within said sleeve, an outer seat for said resilient means detachably connected to the outer end of said sleeve, and an inner seat for said resilient means slidably disposed within said sleeve adjacent the end of the axle whereby upon the lateral movement of the axle in the direction of said sleeve force will be exerted against the end of said axle to adjust the same back to its normal position, said resilient means and inner seat being removable through the outer end of said sleeve when the outer seat is detached.

2. In a lateral motion journal box construction, the combination of a journal box, an axle having a journal, an axle journal bearing disposed within said box and adapted to permit the lateral movement of the journal, a sleeve formed in the outer end of said journal box, resilient means disposed within said sleeve, an outer seat for said resilient means, means formed on the outer end of said sleeve adapted to engage said outer seat to hold the same in position, an inner seat for said resilient means slidably disposed within said sleeve adjacent the end of the axle whereby upon the lateral movement of the axle in the direction of said sleeve force will be exerted against the end of same to adjust said axle back to its normal position.

3. In a lateral motion journal box construction, the combination of a journal box, an axle having a journal, an axle journal bearing disposed within said box and adapted to permit the lateral movement of the journal, a sleeve formed in the outer end of said journal box, resilient means disposed within said sleeve, an outer seat for said resilient means, gib members formed on the outer end of said sleeve, outward projections formed on said outer seat adapted to engage with said gib members for holding said outer seat in position, an inner seat for said resilient means slidably disposed within said sleeve adjacent the end of the axle whereby, upon the lateral movement of the axle in the direction of said sleeve, force will be exerted against the end of same to adjust said axle back to its normal position.

4. In a lateral motion journal box construction, the combination of a journal box, an axle having a journal, an axle journal bearing disposed within said box and adapted to permit the lateral movement of the journal, a sleeve formed in the outer end of said journal box, resilient means disposed within said sleeve, an outer seat for said resilient means, gib members formed on the outer end of said sleeve, outward projections formed on said outer seat adapted to engage with said gib members for holding said outer seat in position, cooperating means on said journal box and said outer seat for securing the latter in its engaged position, an inner seat for said resilient means slidably disposed within said sleeve adjacent the end of the axle whereby, upon the lateral movement of the axle in the direction of said sleeve, force will be exerted against the end of said axle to adjust the same back to its normal position.

5. In a lateral motion journal box construction, the combination of a journal box, an axle having a journal, an axle journal bearing disposed within the said box adapted to permit the lateral movement of the journal, a sleeve disposed in the outer end of said journal box, resilient means disposed within said sleeve, outer and inner seats for said resilient means, a rib member formed on said sleeve and the outer end of said journal box, gib members formed on the outer end of said sleeve, projections formed on said outer seat adapted to engage with said gib members to hold the outer seat in position, an arm formed on said outer seat adapted to be connected with said rib member to secure the said outer seat in its engaged position, means for securing the arm and rib member together, the said inner seat being disposed within said sleeve adjacent the end of the axle whereby, upon the lateral movement of said axle toward the sleeve, force will be exerted against the end of said axle to adjust the same back to its normal position.

6. The combination of a journal box, an axle having a journal, an axle journal bearing disposed within the box adapted to permit lateral movement of the journal, means for exerting force against the end of said axle when the axle is laterally moved toward the journal box, comprising a sleeve formed in the outer end of said box, resilient means disposed within said sleeve, and an inner seat for said resilient means disposed within said sleeve adjacent the end of the axle, the upper outer end of said journal box being open, and a cover for said opening having a recess in its lower end adapted to fit around the said sleeve.

7. The combination of a journal box, an axle having a journal, an axle journal bearing disposed within the box adapted to permit lateral movement of the journal, means for exerting force against the end of said axle when the axle is laterally moved toward the journal box, comprising a sleeve formed in the outer end of said box, resilient means disposed within said sleeve, and an inner seat for said resilient means disposed within said sleeve adjacent the end of the axle, the upper outer end of said journal box being open, and a cover for said opening hingedly connected to said box and having a recess in its lower end adapted to fit around the said sleeve.

8. In a lateral motion journal box construction, the combination of a journal box, an axle having a journal, an axle journal bearing disposed within said box adapted to permit the lateral movement of the journal, and means for exerting force against the end of said axle journal when the latter is laterally moved toward the outer end of the journal box, comprising a sleeve formed in the outer end of said box, a removable outer end member for said sleeve, a spring operably disposed within said sleeve against said end member, a seat slidably disposed within said sleeve and adapted for removal from said sleeve through the outer end thereof, and a member for engaging said seat and end member with said spring normally holding the seat under the tension of the spring adjacent to but free from pressure upon the end of the axle, said seat, spring and members forming a unit removable through the outer end of said sleeve.

9. In a lateral motion journal box construction, the combination of a journal box, an axle having a journal, an axle journal bearing disposed within said box adapted to permit the lateral movement of the journal, and means for exerting force against the end of said axle journal when the latter is laterally moved toward the outer end of the journal box, comprising a sleeve formed in the outer end of said box, a spring operably disposed within said sleeve, an outer seat for said spring detachably connected to the outer end of said sleeve, an inner seat slidably disposed within said sleeve, and a bolt engaging said seats with said spring, normally holding the inner seat under the tension of the spring adjacent to the end of the axle, said seats, spring and bolt being removable as a unit through the outer end of the sleeve when the outer seat is detached.

ROGER W. CLIFFORD.